March 20, 1934.　　G. C. BURD ET AL　　1,951,723
METALLIC CONDUIT
Filed Sept. 15, 1928
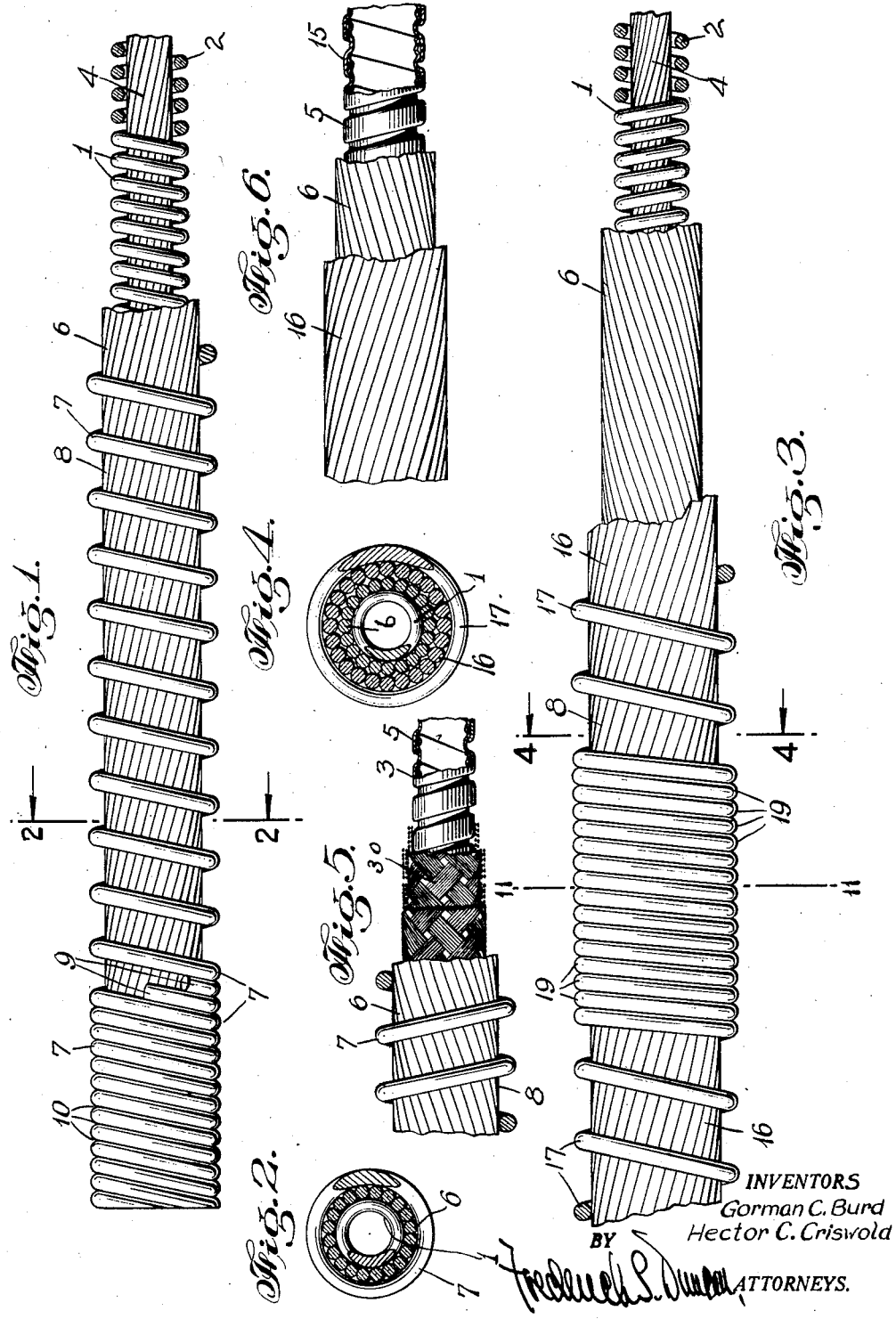
INVENTORS
Gorman C. Burd
Hector C. Criswold
BY
ATTORNEYS.

Patented Mar. 20, 1934

1,951,723

UNITED STATES PATENT OFFICE 1,951,723

METALLIC CONDUIT

Gorman C. Burd, Brooklyn, N. Y., and Hector C. Griswold, Summit, N. J., assignors to American Cable Company, Inc., a corporation of Delaware Application September 15, 1928, Serial No. 306,226

4 Claims. (Cl. 64—12)

This invention relates to metallic conduit, and more particularly to such conduits as are built up with a series of helically wound metal wires, using the latter term in a generic sense to include metal strips of various cross-sections, and the general object of the present invention is to provide a metallic conduit of the above type which will be relatively inexpensive to manufacture, and which will exhibit to an unusual degree the properties of resistance to longitudinal extension or compression, so that the conduit will be of substantially invariable length, even when flexed.

The novel conduit forming the subject of the present invention is of particular utility when embodied in the construction of conduits to receive the operating cables for automobile brakes which must be installed in a manner that permits pivotal movements of the wheels in steering without appreciable effect on the effective length of the operating cable, inasmuch as a relatively slight change in the length of the enclosing conduit, as at present constructed, for such operating cables will result in what amounts to a change of adjustment of the operating devices for the brakes.

Various expedients have been tried to avoid such changes of length in conduits of this type, but these have either failed to accomplish the desired object, or else have involved undue expense of construction, all of which defects have been remedied by the herein disclosed improvements.

In pursuance of the general object above stated, the present invention provides for building up a metallic conduit comprising an inner metallic tubular member formed of coiled wire or metal strip to afford a smooth path for a lengthwise movable operating cable or operating member which may or may not be rotatable about its own axis; and a tubular conduit member surrounding the aforesaid inner tube and which, in accordance with the improvements of the present invention, is constituted by a stranded wire structure, embodying a multiplicity of wire components laid in helical form around the inner tube with a relatively long pitch, in one or more layers; and then an outer tubular element formed of helically wound wire laid over the stranded wire intermediate tubular element in such a manner as to confine the stranded wire helical element or elements, preventing expansion of the latter while permitting the desired amount of flexure to provide for change of direction in the conduit and its enclosed operating cable or member.

This outer helical tubular envelope may desirably be formed with coils of shorter pitch than the intermediate element, and these coils may be spaced apart to reduce the amount of material employed and thus to reduce the expense of construction, such spaced coils permitting flexure to the desired extent while serving in combination with the intermediate helices of the stranded wire structure to produce a novel technical effect, viz., the formation of a large number of strut-like divisions of the component intermediate helices so that the intermediate element cannot contract under longitudinal compression and so retains an invariable length, the long pitch of the helices of the intermediate helical components serving to resist elongation of the conduit under tension, so that the length of the conduit as a unitary structure remains invariable under tension also.

Thus, the novel conduit accomplishes the purpose already set forth, viz., to afford a smooth conduit for the operating cable or element, permitting changes of direction thereof, both for purposes of installation and to accommodate pivotal movements of the wheels, without varying the effective length of the operating cable or member.

It is to be understood that the use of the improved conduit for other purposes than brake-operating cables is contemplated, inasmuch as the improvements may be utilized in any field for which they are adapted by their nature.

The various features of the invention are illustrated and described fully in the accompanying drawing and specification and are pointed out in the claims.

In the drawing,

Fig. 1 is a side elevation of a metallic conduit in the construction of which the invention has been embodied, parts being broken away to reveal interior structure.

Fig. 2 is a sectional view on the line 2—2 of Fig. 1.

Fig. 3 is a view, similar to Fig. 1, of a modified form of metallic conduit.

Fig. 4 is a sectional view on the line 4—4 of Fig. 3 with cable omitted.

Fig. 5 is a view like Fig. 1, showing a conduit having an inner tube of modified form.

Fig. 6 is a similar view of another modification.

In the now-preferred embodiment of the invention selected for illustration and description, and referring to Figs. 1 and 2, the part designated by the reference character 1 is a tubular element, herein referred to as the inner tube, for the sake of brevity, and which is desirably formed of a wire or strip 2, wound helically, the wire strip being shown as of circular cross-section, but wire of other shapes may be used for the inner tube, and other forms of inner tubes may be used.

The inner tube, however made, is preferably formed with coils of relatively short pitch, and so constructed as to permit a certain amount of accommodation of the convolutions to bending movements transversely of the longitudinal axis of the structure, so that the mean central line will remain of constant length, the coils being preferably arranged closely enough, however, to afford a smooth path for the operating cable or member 4, which may be considered as the operating cable for an automobile brake, installed in the usual manner, which is well-known to those skilled in the art, and does not require illustration.

In pursuance of the invention, the inner tube 1 is surrounded by a stranded wire structure 6, of any suitable material and form, and which may desirably be formed of relatively high-carbon steel wires or components, laid helically in close juxtaposition with the inner tube 1, and preferably comprising a multiplicity of closely disposed wires or strips of round or other suitable cross-section, laid with a relatively long pitch, as illustrated, for the purpose of resisting compression longitudinally that would tend to shorten the conduit; and similarly serving to resist elongation of the latter under tension, as for example when a mechanic, working under an automobile, grasps the conduit and pulls himself up to change his position, a contingency which occurs frequently, and which has been known to distort metallic conduits of the type heretofore used.

In further pursuance of the invention, we prefer to provide an outer tubular element adapted to confine the stranded wire element, and serving to aid the latter in resisting any tendency to birdcage, or open out radially, under compression longitudinally, as for example when the operating member 4 is placed under tension upon operation of the brakes.

For the above purpose, we prefer to provide an outer element 7 comprising a wire or strip coiled tightly upon the stranded wire element with coils of a shorter pitch, substantially as illustrated, the coils being preferably spaced apart somewhat, for the sake of saving in material, and to permit a somewhat greater degree of flexibility than if the coils of this outer element are laid in close relation with each other.

When laid as illustrated, the portions 8 of the stranded wire structure between the coils 7 of the outer element constitute in effect a series of longitudinal struts, each tending to resist compressive strains, and in the aggregate co-operating with each other and with the confining coils 7 to afford an extremely effective resistance to such compressive strains, while permitting desirable flexure of the conduit.

The metallic conduit, constructed in accordance with this invention may be modified in some particulars without departing from the spirit of the invention. For example, instead of having a single layer of wire components in the stranded wire structure, use may be made of a plurality of such layers, as shown in Figs. 3 and 4, in which some of the parts are similar in structure and operation to parts bearing the same reference characters already described, and accordingly will not be described again in detail.

The essential difference in construction comprises the provision of an additional element of stranded wire structure 16 which is laid in opposite direction to the element 6 and serves in co-operation therewith not only to afford increased resistance to compression but also resistance to torsion in both directions, and this compound structure is of particular utility where these qualities are so essential as to warrant the additional expense of manufacture, and where less flexibility is needed.

It may be noted that in general it is desirable to form each coiled element with a lay opposite to that of the adjacent coiled elements, as is usual in composite structures of this type, so that any untwisting action is counteracted rather than cumulative.

In pursuance of a further object of the invention, provision is made preferably at the ends of the conduit for attachment of fittings thereto, and for this purpose any suitable structure may be used, one convenient form being shown at the left-hand end of Fig. 1 where an additional wire or wires 9 are laid in between the coils 7, so as to present an extended surface of closely disposed coils 7 and 9, with helical interstices 10, well adapted to receive a sleeve or like fitting which is not illustrated in detail herein, as the same is shown and described in the co-pending application of Gorman C. Burd, Serial Number 301,759, filed August 24, 1928, wherein it is made the subject of generic claims.

In the structure illustrated in Fig. 3, the same object is served by forming the outer element 17 with coils 19 of shorter pitch at the region where an attachment is to be fitted, and another novel feature of the invention comprises the formation of this attachment portion as part of the general operation of winding the outer coiled element 7 upon an extended stock of the conduit which is eventually to be divided up into sections of predetermined length.

Thus the outer coiled element 17 can be wound with separated coils throughout the stock except at the portions where the ends are to be formed, and at these regions, represented by the reference character 19 the pitch of the outer element may be shortened for a distance equal to twice the length of the attachment portion to be provided, and so when the stock has been severed, as for example at the transverse plane indicated at 11, each section of stock will be left with a closely wound attachment portion of the appropriate length.

The extra coils 9 shown in Fig. 1 may be similarly applied at suitable intervals, and the conduit cut at the middle, or any desired part, of the closely wound portion, so as to provide the sections of conduit with attachment portions of proper length at their respective ends.

The inner tube illustrated in Fig. 5 shows a modification, in which a common type of conventional flexible metallic conduit 3 is used, being formed of coiled flat metal stock having an approximately S-shaped cross-section, and provided at 5 with a packing strip, where such packing is required by the use for which the tube is intended. This metallic tube is shown as provided also with a sheath 30 of braided fabric, preferably of metal, metallic conduits thus sheathed being of conventional form in this art. The outer reinforcing coil may be omitted, when plural layers 6 and 16 of multiple strands are used, as shown in Fig. 6, which illustrates at 15 a similar S-shaped strip tube, without a packing strip, as such omissions do not interfere with the utility of the tube for many applications, the general structure of the conduit being otherwise identical with that already described.

Other changes may likewise be made, without departing from the spirit of the invention, such for example as changes in the pitch of any of the helically wound elements; or the addition of a boot of leather or textile fabric, in a manner well-known in the art, to meet the requirements of particular installations.

We claim:

1. A metallic conduit characterized by an inner tubular element, formed of helically wound wire, and a plurality of outer tubular elements each comprising multiple helically formed wires, wound with a longer pitch than the inner element, the coils of each element being wound in a direction opposite to that of the next adjacent element, and the inner tubular element being formed with spaced coils.

2. A metallic conduit characterized by inner and outer tubular elements, respectively formed of helically wound wires, and a plurality of intermediate tubular elements each comprising multiple helically formed wires, wound with a longer pitch than the inner and outer elements and having their coils respectively disposed in opposite directions to each other and to the coils of the adjacent inner and outer elements, and the inner and outer tubular elements being formed with spaced coils.

3. A metallic conduit characterized by a tubular metal inner element formed of coiled wire of relatively short pitch, a tubular structure formed thereon comprising helical wire components of relatively long pitch, and an outer tubular element formed of wire having coils of shorter pitch, the inner and outer tubular elements being formed with spaced coils and a portion of the outer element being formed with closely disposed coils to afford a compact attachment portion.

4. A metallic conduit characterized by a tubular metal inner element formed of coiled wire of relatively short pitch, a tubular structure formed thereon comprising helical wire components of relatively long pitch, an outer tubular element formed of wire having coils of shorter pitch, and an additional wire wound between the coils of the outer element to afford a compact attachment portion.

GORMAN C. BURD.
HECTOR C. GRISWOLD.